United States Patent
Zhou et al.

(10) Patent No.: US 8,099,409 B2
(45) Date of Patent: *Jan. 17, 2012

(54) SYSTEM, METHOD, AND COMPUTER-READABLE MEDIUM FOR DUPLICATION OPTIMIZATION FOR PARALLEL JOIN OPERATIONS ON SIMILARLY LARGE SKEWED TABLES

(75) Inventors: Xin Zhou, Monterey Park, CA (US); Olli Pekka Kostamaa, Santa Monica, CA (US)

(73) Assignee: Teradata US, Inc., Dayton, OH (US)

( * ) Notice: Subject to any disclaimer, the term of this patent is extended or adjusted under 35 U.S.C. 154(b) by 509 days.

This patent is subject to a terminal disclaimer.

(21) Appl. No.: 12/203,209

(22) Filed: Sep. 3, 2008

(65) Prior Publication Data

US 2010/0057672 A1 Mar. 4, 2010

(51) Int. Cl.
*G06F 17/30* (2006.01)
(52) U.S. Cl. ......................... 707/714; 707/770
(58) Field of Classification Search .................. 707/713, 707/714, 769, 770
See application file for complete search history.

(56) References Cited

U.S. PATENT DOCUMENTS

| | | | | |
|---|---|---|---|---|
| 5,873,074 A * | 2/1999 | Kashyap et al. | ....... | 707/999.002 |
| 5,884,320 A * | 3/1999 | Agrawal et al. | ........ | 707/999.002 |
| 5,978,793 A * | 11/1999 | Kashyap et al. | ....... | 707/999.002 |
| 7,054,852 B1 * | 5/2006 | Cohen | .................. | 707/999.001 |
| 7,085,769 B1 * | 8/2006 | Luo et al. | ................. | 707/999.01 |
| 7,685,193 B2 * | 3/2010 | Cohen | ........................... | 707/714 |
| 2006/0117036 A1 * | 6/2006 | Cruanes et al. | ............... | 707/100 |
| 2007/0276788 A1 * | 11/2007 | Cohen | .............................. | 707/2 |
| 2009/0024568 A1 * | 1/2009 | Al-Omari et al. | ................. | 707/2 |

* cited by examiner

*Primary Examiner* — Khanh Pham
(74) *Attorney, Agent, or Firm* — Steve McDonald (57) ABSTRACT

A system, method, and computer-readable medium for optimizing join operations in a parallel processing system are provided. A respective set of rows of a first table and a second table involved in a join operation are distributed to each of a plurality of processing modules. The join operation comprises a join on a first column of the first table and a second column of the second table. Each of the plurality of processing modules redistributes at least a portion of the rows of the first table distributed thereto substantially equally among the other processing modules and duplicates at least a portion of the rows of the second table distributed thereto among the plurality of processing modules. The disclosed optimization mechanisms provide for reduced spool space requirements for execution of the parallel join operation.

2 Claims, 8 Drawing Sheets

SYSTEM, METHOD, AND COMPUTER-READABLE MEDIUM FOR DUPLICATION OPTIMIZATION FOR PARALLEL JOIN OPERATIONS ON SIMILARLY LARGE SKEWED TABLES

BACKGROUND

A database is a collection of stored data that is logically related and that is accessible by one or more users or applications. A popular type of database is the relational database management system (RDBMS), which includes relational tables, also referred to as relations, made up of rows and columns (also referred to as tuples and attributes). Each row represents an occurrence of an entity defined by a table, with an entity being a person, place, thing, or other object about which the table contains information.

One of the goals of a database management system is to optimize the performance of queries for access and manipulation of data stored in the database. Given a target environment, an optimal query plan is selected, with the optimal query plan being the one with the lowest cost (e.g., response time) as determined by an optimizer. The response time is the amount of time it takes to complete the execution of a query on a given system.

In massively parallel processing (MPP) systems, dealing with data skew in parallel joins is critical to the performance of many applications. As is understood, a join comprises a structured query language (SQL) operation that combines records from two or more tables. Contemporary parallel database systems provide for the distribution of data to different parallel processing units, e.g., Access Module Processors (AMPs), by utilizing hash redistribution mechanisms. As referred to herein, hash redistribution comprises generating a hash value of, for example, column or index values of a table and redistributing the corresponding rows to processing modules based on the hash values. Then, when joining two relations, e.g., relations "R" and "S", by join conditions such as R.a=S.b, rows in both tables with the same join column values need to be relocated to the same processing unit in order to evaluate the join condition. To achieve this, contemporary systems typically implement one of two options.

Assuming R and S are partitioned across various processing units and that neither R.a nor S.b is the primary index, e.g., the values that are hashed to distribute the base table rows to the processing units. The MPP optimizer may hash redistribute rows of R on R.a and hash redistribute rows of S on S.b. By using the same hash function, rows with the same join column values are ensured to be redistributed to the same processing unit. The optimizer will then choose the best join method in the local processing unit, e.g., based on collected statistics or other criteria. Such a parallel join mechanism is referred to herein as redistribution.

Redistribution is typically efficient when the rows are sufficiently evenly distributed among the processing units. However, consider the case where there is highly skewed data in column R.a and/or S.b. In this situation, a processing unit will have an excessive load with respect to other processing units involved in the join operation. A processing unit featuring an excessive load in such a situation is referred to herein as a hot processing unit. Consequently, the system performance is degraded and may result in an "out of spool space" error on the hot processing unit which may cause, for example, queries to abort after hours of operation in large data warehouses.

Alternatively, the optimizer may choose to duplicate the rows of one relation among the processing units. For example, assume the relation R is much larger than the relation S. In such a situation, the rows of R may be maintained locally at each processing unit where R resides, and the rows of S are duplicated among each of the processing units. Such a mechanism is referred to as table duplication. By this mechanism, rows with the same join column values will be located at the same processing unit thereby allowing completion of the parallel join operation. However, efficient performance utilizing a duplication mechanism requires for one relation to be sufficiently small to allow for duplicating on all the parallel units.

Further, partial redistribution, partial duplication (PRPD) mechanisms have been proposed for an optimizer to use when joining large tables where data skew is known and the skewed data values are also known. However, PRPD routines are disadvantageous when one relation is not significantly larger than the other relation.

SUMMARY

Disclosed embodiments provide a system, method, and computer readable medium for optimizing join operations in a parallel processing system. A respective set of rows of a first table and a second table involved in a join operation are distributed to each of a plurality of processing modules. The join operation comprises a join on a first column of the first table and a second column of the second table. Each of the plurality of processing modules redistributes at least a portion of the rows of the first table distributed thereto substantially equally among the other processing modules and duplicates at least a portion of the rows of the second table distributed thereto among the plurality of processing modules. The disclosed optimization mechanisms provide for reduced spool space requirements for execution of the parallel join operation.

BRIEF DESCRIPTION OF THE DRAWINGS

Aspects of the present disclosure are best understood from the following detailed description when read with the accompanying figures, in which.

DETAILED DESCRIPTION

It is to be understood that the following disclosure provides many different embodiments or examples for implementing different features of various embodiments. Specific examples of components and arrangements are described below to simplify the present disclosure. These are, of course, merely examples and are not intended to be limiting.

Figure 1:
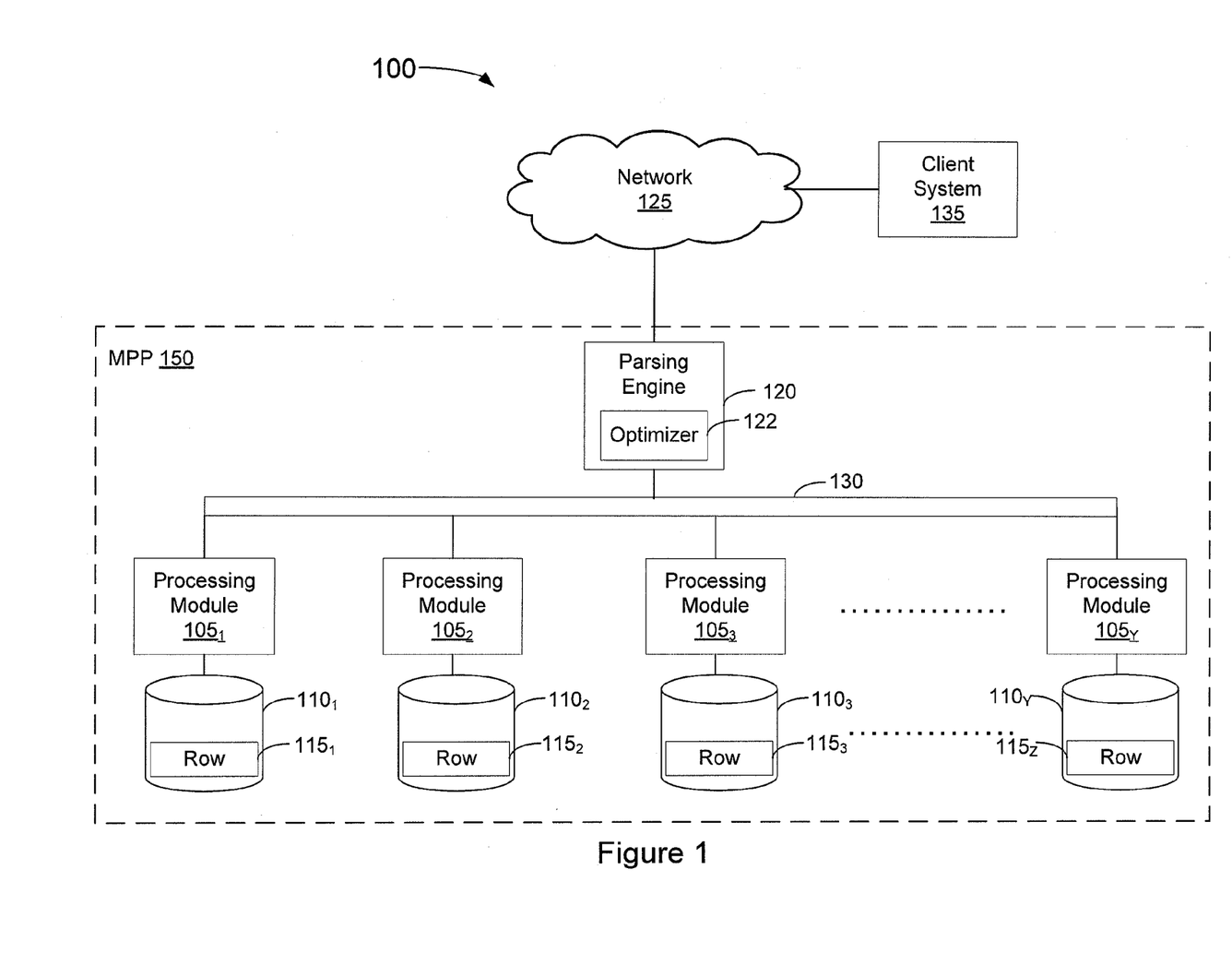
FIG. 1 depicts a diagrammatic representation of an exemplary architecture for a large database system that is suited for implementing duplication optimization for parallel joins in accordance with disclosed embodiments.

FIG. 1 depicts a diagrammatic representation of an exemplary architecture for a large database system 100, such as a Teradata Active Data Warehousing System, that is suited for implementing duplication optimization for parallel joins in accordance with disclosed embodiments. The database system 100 includes a relational database management system (RDBMS) built upon a massively parallel processing (MPP) system 150. Other types of database systems, such as object-relational database management systems (ORDBMS) or those built on symmetric multi-processing (SMP) platforms, are also suited for use. The depicted and described architecture is exemplary only and is chosen to facilitate an understanding of the disclosed embodiments.

As shown, the database system 100 includes one or more processing modules $105_1 \ldots _Y$ that manage the storage and retrieval of data in data-storage facilities $110_1 \ldots _Y$. Each of the processing modules may host one or more processing units, such as one or more AMPs. Each of the processing modules $105_1 \ldots _Y$ manages a portion of a database that is stored in a corresponding one of the data-storage facilities $110_1 \ldots _Y$. Each of the data-storage facilities $110_1 \ldots _Y$ includes one or more disk drives or other storage medium.

The system stores data in one or more tables in the data-storage facilities $110_1 \ldots _Y$. The rows $115_1 \ldots _Z$ of the tables are stored across multiple data-storage facilities $110_1 \ldots _Y$ to ensure that the system workload is distributed evenly across the processing modules $105_1 \ldots _Y$. A parsing engine 120 organizes the storage of data and the distribution of table rows $115_1 \ldots _Z$ among the processing modules $105_1 \ldots _Y$ and accesses processing modules $105_1 \ldots _Y$ via an interconnect 130. The parsing engine 120 also coordinates the retrieval of data from the data-storage facilities $110_1 \ldots _Y$ in response to queries received from a user, such as one using a client computer system 135 connected to the database system 100 through a network connection 125. The parsing engine 120, on receiving an incoming database query, applies an optimizer component 122 to the query to assess the best plan for execution of the query. Selecting the optimal query-execution plan includes, among other things, identifying which of the processing modules $105_1 \ldots _Y$ are involved in executing the query and which database tables are involved in the query, as well as choosing which data-manipulation techniques will serve best in satisfying the conditions of the query. Database statistics are used in making these assessments during construction of the query-execution plan. For example, database statistics may be used by the optimizer to determine data demographics, such as attribute minimum and maximum values and data ranges of the database. The database system typically receives queries in a standard format, such as the Structured Query Language (SQL) put forth by the American National Standards Institute (ANSI).

Figure 2:
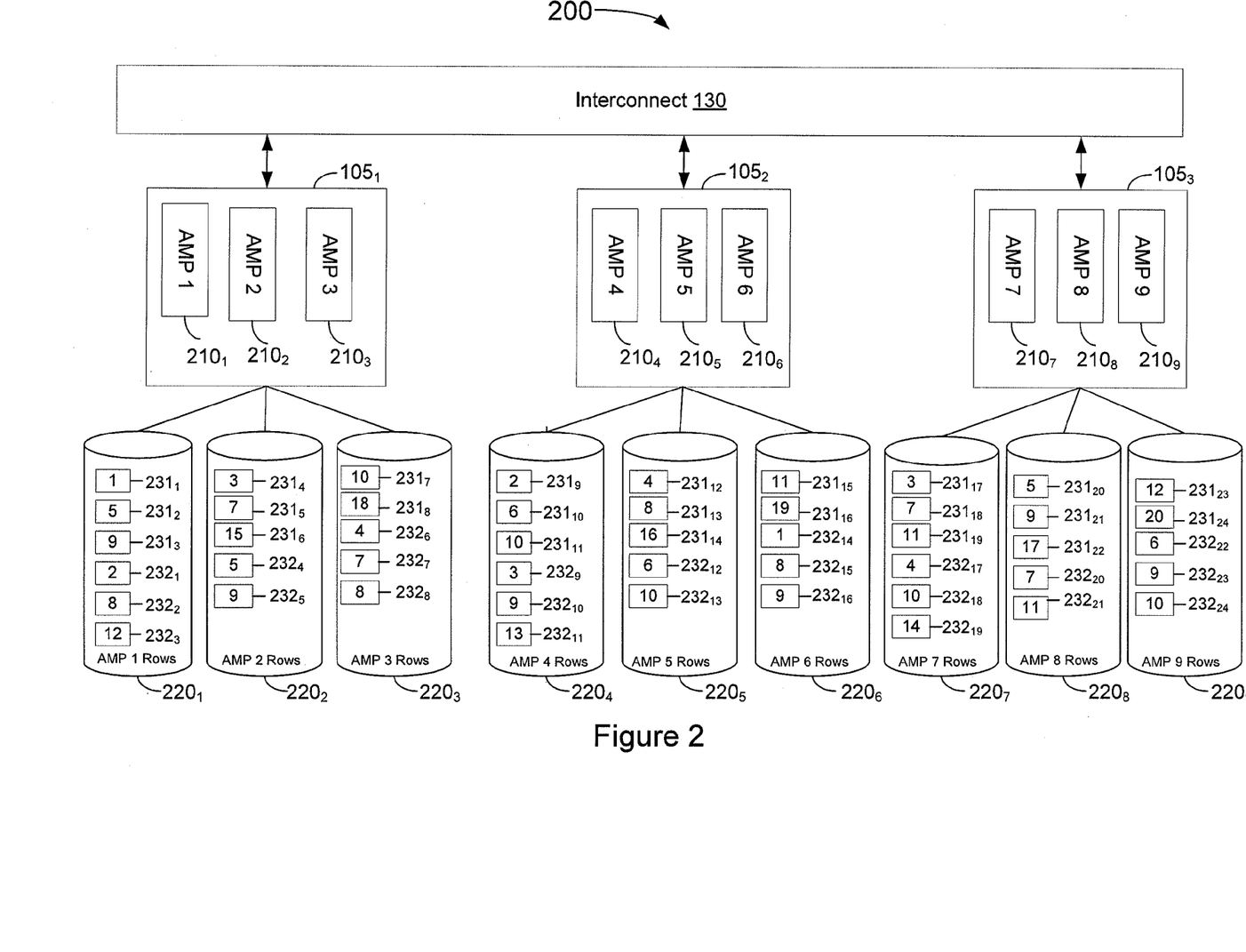
FIG. 2 is a diagrammatic representation of a massively parallel processing configuration in which a table redistribution may be performed to facilitate execution of a parallel join.

FIG. 2 is a diagrammatic representation of an MPP configuration 200 in which a table redistribution may be performed to facilitate execution of a parallel join. In the illustrative example, assume the rows of two tables have been distributed across nine AMPs $210_1$-$210_9$ hosted by processing modules $105_1$-$105_3$ such that each of the AMPs is allocated rows $220_1$-$220_9$. Consider a join operation to be executed that is specified by the following:

Select*from TableR, TableS where TableR.a=TableS.b

Figure 3:
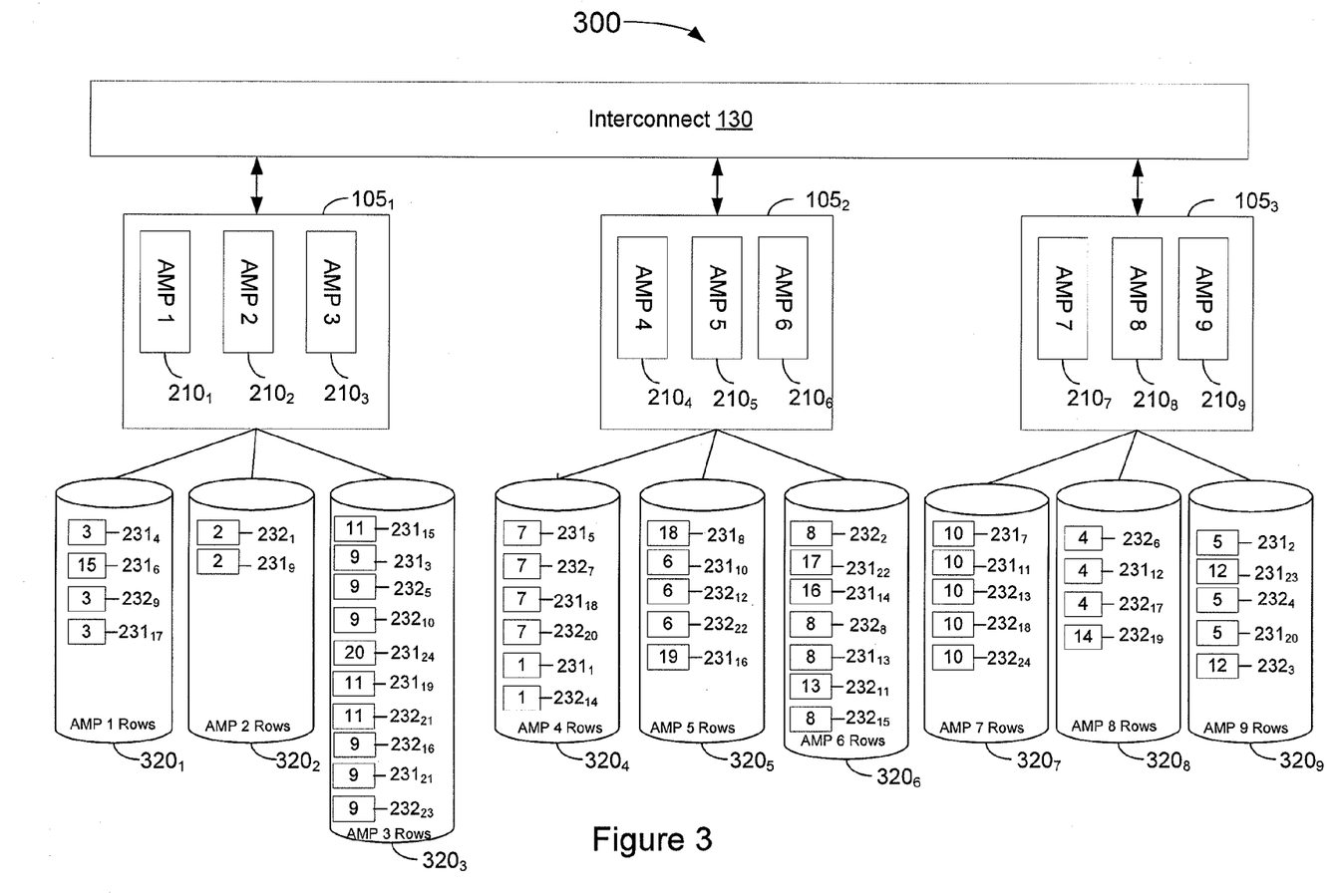
FIG. 3 depicts a diagrammatic representation of a redistribution of table rows depicted in FIG. 2 that facilitates execution of the parallel join operation.

In the present example, column a elements of TableR are designated $231_1$-$231_{24}$ and column b elements of TableS are designed $232_1$-$232_{24}$. Assume that the rows of TableR and TableS are distributed among AMPs $210_1$-$210_9$ via a hash of primary indexes of TableR and TableS and that the primary indexes include neither column a of TableR nor column b of TableS. In this situation, the rows may be redistributed by hashing the join columns and redistributing the rows based on the hash values such that rows from TableR and TableS that match on the join columns TableR.a and TableS.b are redistributed to the same AMPs. For example, FIG. 3 depicts a diagrammatic representation 300 of a redistribution of the table rows $220_1$-$220_9$ that facilitates execution of the join operation. Each AMP $210_1$-$210_9$ hashes the rows $220_1$-$220_9$ originally distributed thereto, and redistributes the rows according to the hash values. Accordingly, the AMPs $210_1$-$210_9$ respectively receive redistributed rows $320_1$-$320_9$. By hashing the column elements of the join statement, matching column elements are redistributed to a common AMP, and the join statement may then be completed in parallel. For example, element $231_1$ of TableR.a has a value of "1", and element $232_{14}$ of Table 2.b has a value of "1". Because neither column a of TableR nor column b of TableS is included in the primary indexes by which the tables are originally distributed in the MPP system, element $231_1$ and $232_{14}$ are originally distributed to AMP $210_1$ and $210_6$ as depicted in FIG. 2. By hashing the join columns and redistributing the tables according to the hashed elements, both element $231_1$ and $232_{14}$ are redistributed to a common AMP, e.g., AMP $210_4$ as depicted in FIG. 3. After hash redistribution of the tables, the join operation may then be executed in parallel.

Redistribution of tables for execution of a parallel join is efficient if data skew is small. However, numerous problems may be encountered in the event that there is data skew in a column on which a join is to be performed as discussed hereinabove.

Table duplication provides an alternative mechanism for executing a parallel join. Suppose relation R is much larger than relation S. In this instance, all rows of the larger table, R, are maintained locally at each AMP to which the table R rows are originally allocated, while all rows of the smaller table, S, are duplicated among all processing modules. By this mechanism, rows with the same join column value will be located at the same processing module to complete the join. However, the duplication mechanism is inefficient when one table is not significantly larger than the other table.

Figure 4:
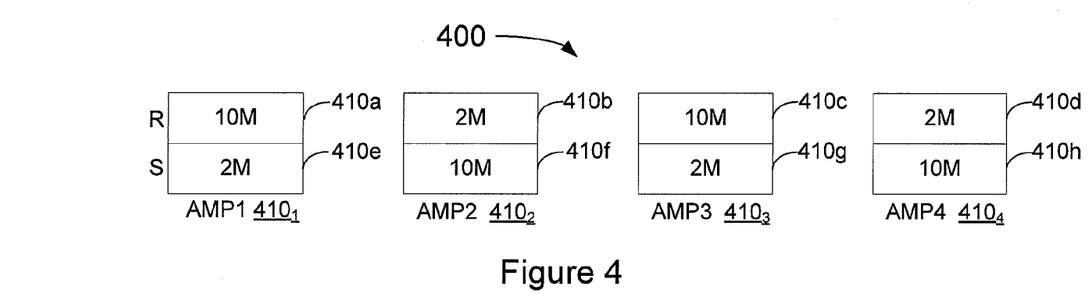
FIG. 4 depicts a diagrammatic representation of an exemplary relation distribution among four processing modules.

For illustrative purposes, assume a join of relations R and S that are partitioned among four processing modules is to be performed with the join condition R.a=S.b. Further assume that R and S each have 24 million rows of equal size, and that R and S are not evenly distributed among the four processing modules as depicted by the diagrammatic representation of an exemplary relation distribution 400 of FIG. 4. In the illustrative example, AMPs $410_1$ and $410_3$ each have 10 million rows 410a and 410c of relation R and 2 million rows 410e and 410g of relation S distributed thereto, and AMPs $410_2$ and $410_4$ have 2 million rows 410b and 410d of relation R and 10 million rows 410f and 410h of relation S distributed thereto. Such as situation may result from, for example, a poor primary index choice or the distribution of R and S comprise spools resulting from a previous join.

For illustrative purposes, assume each AMP has a spool limit of 32 million rows and that rows of R and S comprise a common row size. Note that spool limits are typically specified in bytes or another data size, and the examples provided herein of spool limits based on the number of rows are chosen only to facilitate an understanding of the disclosed embodiments. Suppose there is data skew in the relations R and S, and that if redistribution is chosen for the join operation, a certain AMP will receive more than 32 million rows as a result of the redistribution. In this instance, an out of spool space error would occur. Even if the spool size limit was sufficient, the hot AMP consumes a large amount of time to process, while other AMPs might finish much earlier and become idle while waiting for the hot AMP to complete processing. As a result, the duplication mechanism must be chosen. However, because both R and S have 24M rows in total, there is no difference whether R or S is chosen for duplication. If S is chosen for duplication, the AMP demographics 500 depicted in the diagrammatic representation of FIG. 5 result from the duplication. In this instance, AMPs $410_1$ and $410_3$ have ten million rows 510a and 510c of relation R, AMPs $410_2$ and $410_4$ have two million rows 510b and 510d of relation R, and AMPs $410_1$-$410_4$ each have the complete 24 million rows 510e-510h of relation S as a result of the duplication.

Figure 5:
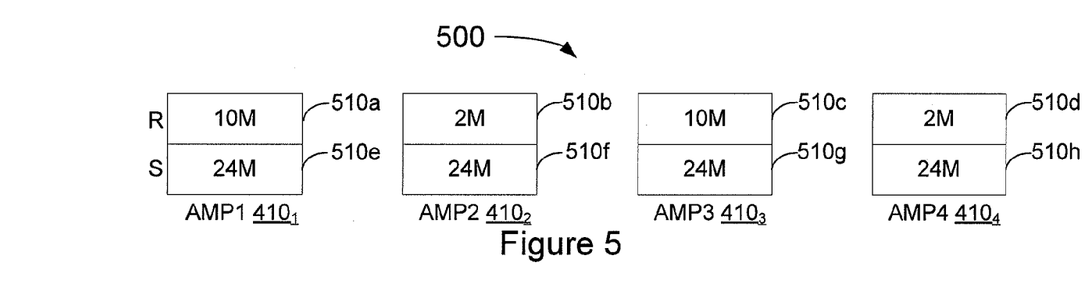
FIG. 5 is a diagrammatic representation of processing module demographics resulting from a duplication mechanism.

The problems of such a duplication mechanism are numerous. First, each AMP $410_1$ and $410_3$ that now has 34M rows exceeds the 32M spool space limit and thus runs out of spool space. Secondly, even if a larger spool space were allocated for the AMPs, AMPs $410_2$ and $410_4$ may finish processing much earlier than AMPs $410_1$ and $410_3$ thus resulting in inefficient utilization of the parallel resources.

In general, duplication is inefficient when one table is not significantly larger than the other table involved in a join operation. In accordance with disclosed embodiments, mechanisms are provided for optimization of parallel join operations involving two large skewed relations of equal or close sizes.

Figure 6:
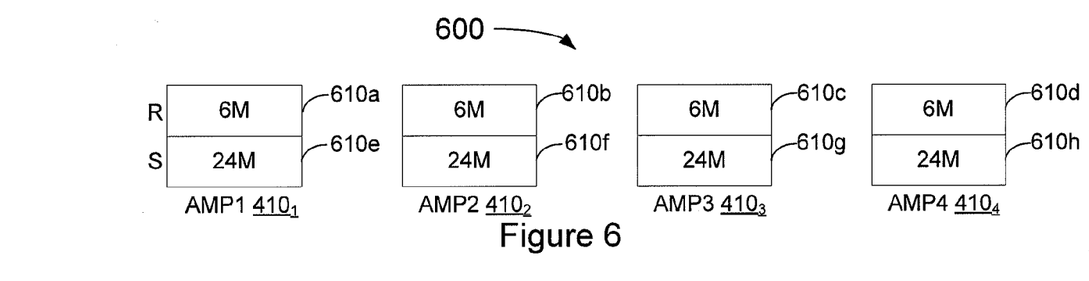
FIG. 6 is a diagrammatic representation of processing module demographics resulting from a redistribution mechanism implemented in accordance with an embodiment.

In an embodiment, a mechanism for optimizing a join operation in a parallel processing system is provided by redistributing one relation substantially or approximately equal among a plurality of processing modules. Consider the relation R and S demographics depicted in FIG. 4 and a system featuring a spool size limit of 32 million rows. In this instance, assume relation S is selected for duplication and that relation R is redistributed equally among the four AMPs $410_1$-$410_4$ resulting in the relation demographics 600 depicted in FIG. 6. In this instance, each of the AMPs $410_1$-$410_4$ receives six million rows 610a-610d as a result of the substantially equal redistribution of the relation R, and each of the AMPs $410_1$-$410_4$ receives twenty four million rows 610e-610h as a result of the duplication of the relation S. Accordingly, none of the AMPs $410_1$-$410_4$ exceeds the spool limit, and each AMP will complete processing at approximately the same time.

Assume two relations R and S are to be joined by the condition R.a=S.b, that relations R and S are of similar sizes, and that relations R and S are distributed to m AMPs or other processing modules. Further assume that the rows sizes of R and S are $RS_R$ and $RS_S$, respectively and that the spool size limit for each AMP is Sp among which j space is required to be reserved for join result spools. The traditional duplication method is unsuitable when:

$$\text{Max}''(R) * RS_R + |S| * RS_S > Sp - j \qquad \text{eq. 1}$$

where $\text{Max}''(R)$ is the maximum number of rows in R on a particular AMP and |S| is the total number of rows of the relation S. In the above example, the traditional duplication method is unsuitable because the sum of the maximum size of the rows ($\text{Max}''(R)*RS_R$) of relation R redistributed to one of the AMPs and the size of the duplicated relation S ($|S|*RS_S$) exceeds the spool space usable for receipt of redistributed and duplicated rows, that is Sp−j.

In such a situation, the above implementation may be utilized whereby one relation is redistributed substantially equally and the other relation is duplicated if the following condition exists:

$$|R|/m * RS_R + |S| * RS_S < Sp - j \qquad \text{eq. 2}$$

That is, if the sum of the size ($|R|/m*RS_R$) of the relation R redistributed substantially equally among m processing modules and the complete size of the relation S is less than the spool space usable for storage of redistributed and duplicated rows, then the described mechanism of redistributing one relation substantially equally among the m processors and duplicating the other relation may be applied.

Figure 7:
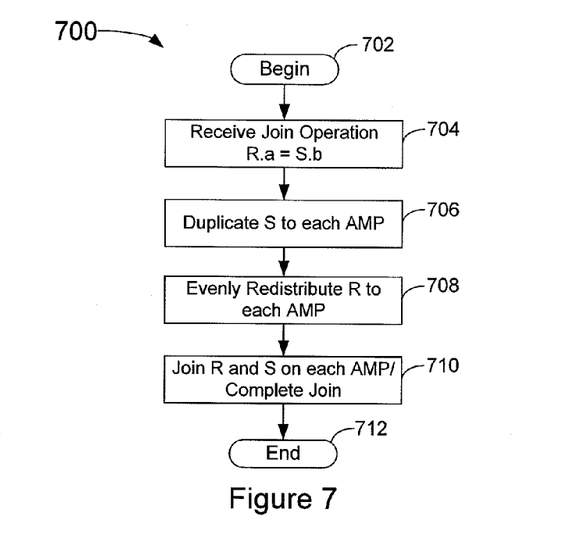
FIG. 7 depicts a flowchart of an optimized join routine that facilitates execution of a join operation in a parallel processing system in accordance with an embodiment.

FIG. 7 depicts a flowchart 700 of an optimized join routine that facilitates execution of a join operation in a parallel processing system in accordance with an embodiment. The join routine is invoked (step 702), and a join operation for relations R and S on attributes R.a=S.b is received (step 704). The relation S is duplicated to each AMP (step 706), and the relation R is redistributed closely equal to each AMP (step 708). Duplication of relation S and redistribution of relation R may be performed in parallel.

To provide close equality in the redistribution of relation R among the m AMPs, a random composite partition key (a, k) may be selected where k is a random number, and the relation R rows may be redistributed on the hash value of the key. Alternatively, rows of relation R may be redistributed on a key (a, C) where C comprises some other column(s) of R and the key (a, C) can assure good redistribution when hashed. In still another embodiment, the composite key (a, C) may be value partitioned if its values are substantially uniform.

After duplication of the relation S and substantially equal redistribution of the relation R rows, R and S are locally joined on each AMP in parallel among the m AMPs and the parallel join may then be completed (step 710). The optimized join routine cycle may then end (step 712).

In accordance with another embodiment, an optimized join mechanism is provided that accommodates tighter spool space restrictions. Again consider a join of two relations R and S with the demographics depicted in FIG. 4 on the join condition R.a=S.b wherein R and S are relations of similar sizes and are distributed to m AMPs. The row sizes for R and S are $RS_R$ and $RS_S$, respectively, and the spool size limit for each AMP is Sp, among which j space is reserved for join result spools (that is, each AMP has Sp−j usable spool space for receipt of redistributed and duplicated rows). Further assume the spool space limit is 25 million rows. The traditional duplication method is unsuitable when $\text{Max}''(R)*RS_R + |S|*RS_S > Sp-j$. Further, assume $|R|/m*RS_R + |S|*RS_S > Sp-j$. Thus, the join optimization described above with reference to FIG. 7 is unsuitable.

Figure 8:
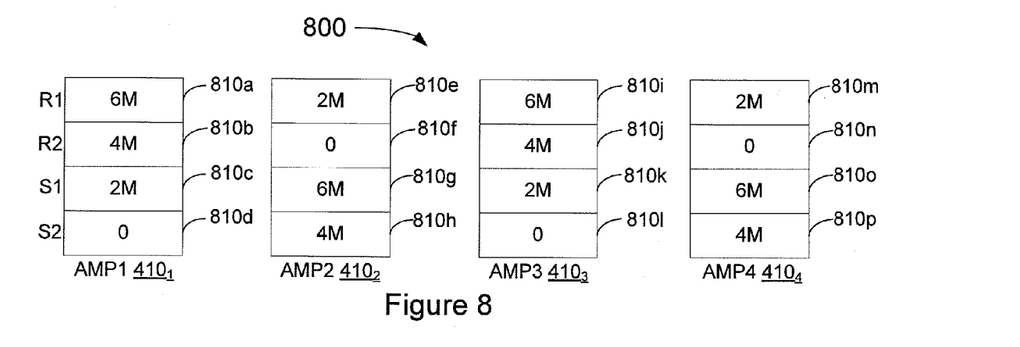
FIG. 8 depicts a diagrammatic representation of processing module demographics resulting from relation division for optimizing a join operation implemented in accordance with an embodiment.

In accordance with an embodiment, each relation R and S on each AMP is divided into two subsets (designated R1, R2, S1, and S2). Assume the relations R and S are divided into two subsets with the demographics 800 depicted in FIG. 8. Particularly, the ten million rows of relation R partitioned to AMP 410₁ are divided into two subsets R1 and R2 respectively having six million rows 810a and four million rows 810b. Likewise, the ten million rows of relation R partitioned to AMP 410₃ are divided into two subsets R1 and R2 respectively having six million rows 810i and four million rows 810j. In a similar manner, the ten million rows of relation S partitioned to AMP 410₂ are divided into two subsets S1 and S2 each respectively having six million rows 810g and four million rows 810h, and the ten million rows of relation S partitioned to AMP 410₄ are divided into two subsets S1 and S2 each respectively having six million rows 810o and four million rows 810p.

Figure 9:
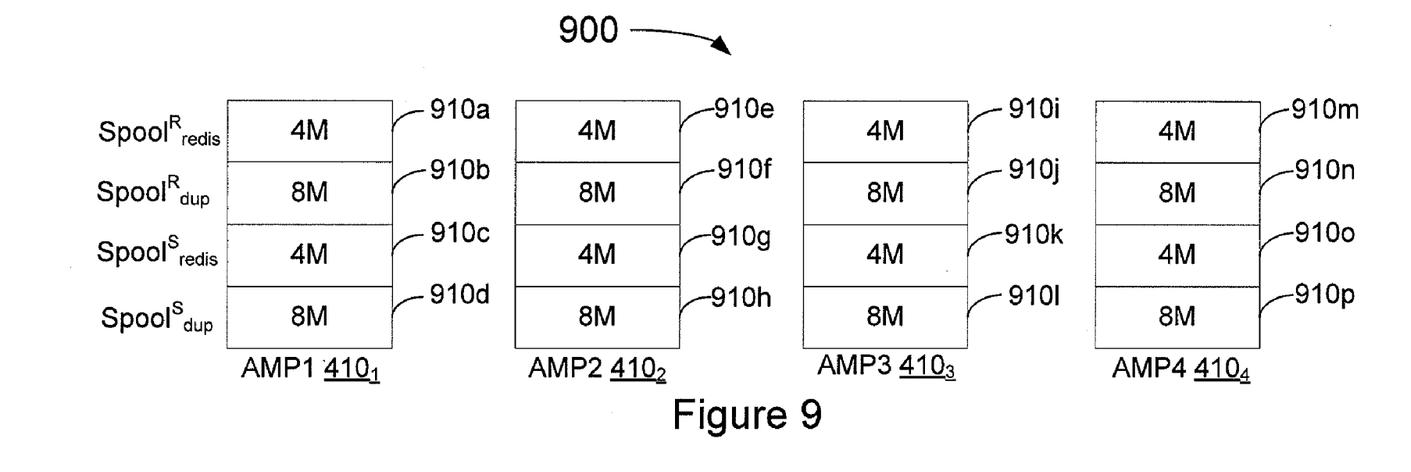
FIG. 9 depicts a diagrammatic representation of processing module demographics resulting from a duplication mechanism implemented in accordance with an embodiment.

After dividing the relations R and S into subsets, the rows of the subsets R1 of respective AMPs 410₁-410₄ are redistributed closely equal among all AMPs 410₁-410₄, and all rows of the subsets R2 of respective AMPs 410₁-410₄ are duplicated among all the AMPs. To achieve a close equal redistribution of the subset R1 rows among the AMPs, the same options as those described above are available. In a similar manner, the rows of the subsets S1 are redistributed substantially equally among the AMPs 410₁-410₄, and the rows of the subsets S2 are duplicated among the AMPs. On receipt of rows of a subset R1 redistributed to a particular AMP, the AMP that receives the redistributed rows of the subset R1 stores the redistributed row in a spool (illustratively designated Spool$^R_{redis}$) allocated for receipt of rows of the relation R redistributed thereto. In a similar manner, on receipt of rows of the subset R2 that have been duplicated to an AMP, the AMP stores the received duplicated row of the relation R in a spool (illustratively designated Spool$^R_{dup}$) allocated for duplicated rows of the relation R. Likewise, redistributed rows of the subset S1 that are received by an AMP are stored in a spool (illustratively designated Spool$^S_{redis}$) allocated for receipt of relation S redistributed rows, and rows of the subset S2 that are received by an AMP as a result of the duplication of the subset S2 are stored in a spool (Spool$^S_{dup}$) allocated therefor. In the present example, the demographics 900 depicted in FIG. 9 result from the above procedure. In the illustrative example, only 24M rows of spool space is required and is within the 25M row spool space limit.

Figure 10:
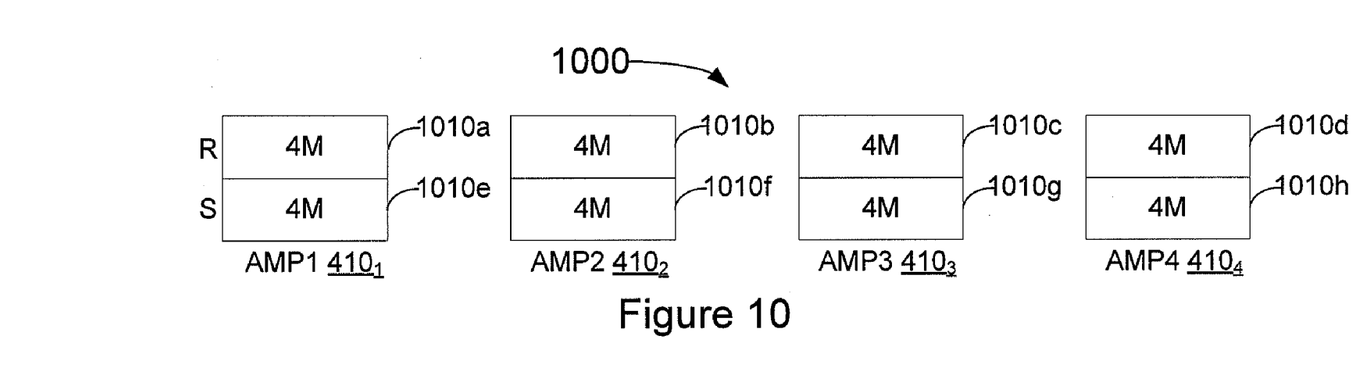
FIG. 10 depicts a diagrammatic representation of an exemplary cardinality resulting from a duplication mechanism implemented in accordance with an embodiment.

After redistribution of the rows of the subsets R1 and S1 and duplication of the rows of the subsets R2 and S2, local joins are performed on each AMP. Specifically, the rows of the spool Spool$^R_{redis}$ are joined with the rows of the spool Spool$^S_{dup}$ at each AMP, and the rows of the spool Spool$^R_{dup}$ are joined with the rows of the spool Spool$^S_{redis}$ at each AMP. Further, one AMP is selected, and the rows of the spool Spool$^R_{dup}$ are joined with the rows of Spool$^S_{dup}$ at the selected AMP. After that, all rows from the spools Spool$^R_{dup}$ and Spool$^S_{dup}$ have been utilized for the operation, and the Spool$^R_{dup}$ and Spool$^S_{dup}$ rows are then removed from the spool space. The exemplary cardinality 1000 depicted in FIG. 10 may then result. The resulting distribution is small enough to perform a traditional duplication of the entire relation S resulting in 20 million rows that is within the 25 million row spool space limit. In the event that the required spool space still exceeds the spool space limit, the above procedure may be repeated until the required spool space for a table duplication is within the spool space limit.

Figure 11:
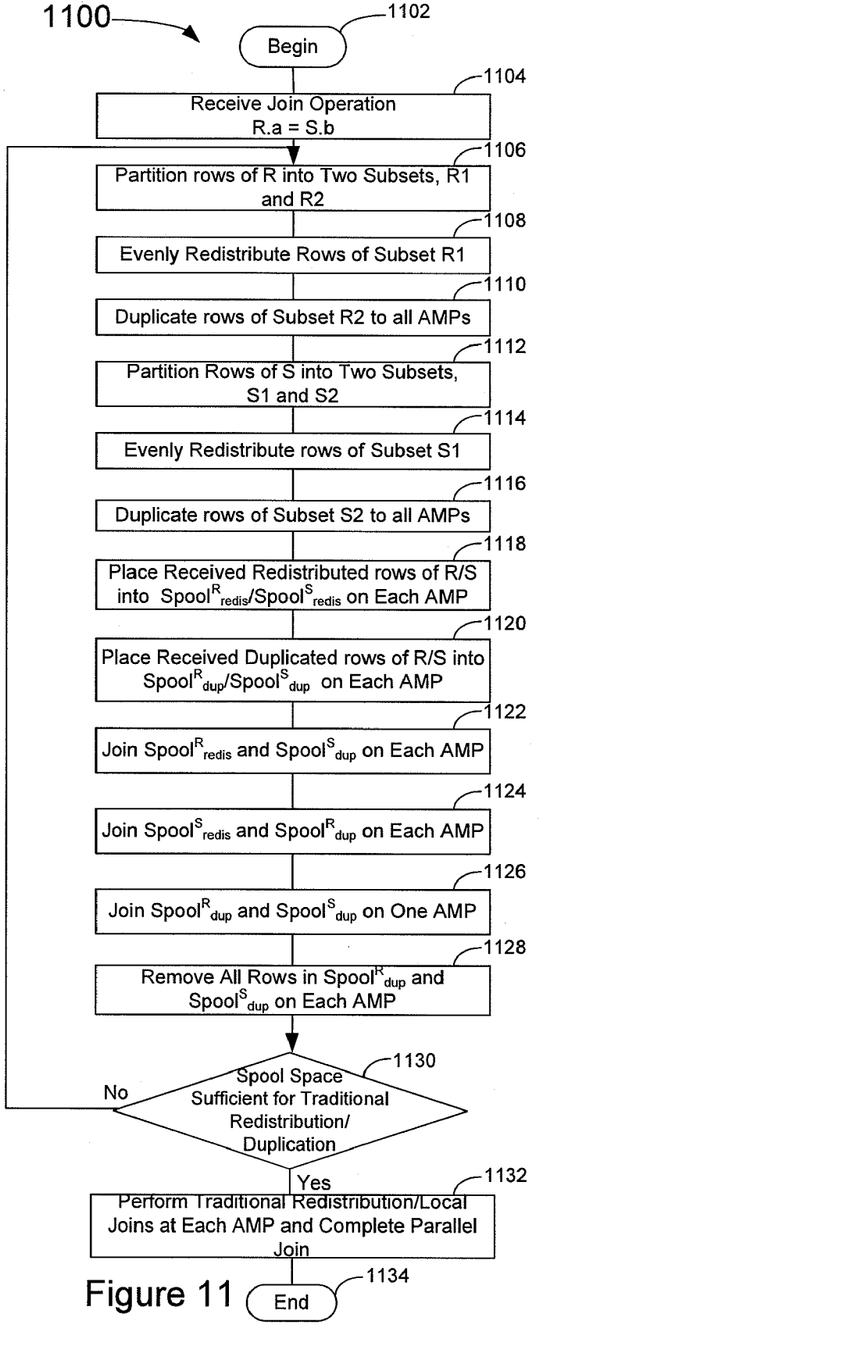
FIG. 11 is a flowchart that depicts processing of a join operation optimization routine implemented in accordance with an embodiment.

FIG. 11 is a flowchart that depicts processing of a join operation optimization routine 1100 implemented in accordance with an embodiment. The optimization routine is invoked (step 1102), and a join operation on relation attributes R.a=S.b is received (step 1104). On each AMP, the rows of the relation R are partitioned into two subsets R1 and R2 (step 1106) as described more fully hereinbelow with reference to FIG. 12. The rows of R1 are redistributed substantially equally among the AMPs (step 1108) and the rows of R2 are duplicated among the AMPs (step 1110). In a similar manner, the rows of the subset S are partitioned into two subsets S1 and S2 at each AMP (step 1112). The rows of the subsets S1 are then redistributed substantially equally by each AMP (step 1114) and the rows of the subsets S2 are duplicated by each AMP (step 1116).

Each AMP, on receipt of rows of the subsets R1 and S1 redistributed thereto, places the redistributed rows into a respective spool Spool$^R_{redis}$ and Spool$^S_{redis}$ (step 1118). Likewise, each AMP, on receipt of rows of the subset R2 and S2 duplicated thereto, place the duplicated rows into a respective spool Spool$^R_{dup}$ and Spool$^S_{dup}$ (step 1120).

When all rows have been redistributed or duplicated among the AMPs, each AMP then joins the rows of the AMP's respective spools Spool$^R_{redis}$ and Spool$^S_{dup}$ (step 1122) and joins the rows of the AMP's respective spools Spool$^S_{redis}$ and Spool$^R_{dup}$ (step 1124). One AMP is then selected for joining the rows of the AMP's spools Spool$^R_{dup}$ and Spool$^S_{dup}$ (step 1126). The rows in each AMPs' respective spools Spool$^R_{dup}$ and Spool$^S_{dup}$ are then removed (step 1128). An evaluation may then be made to determine if the join operation may be completed according to a traditional redistribution or duplication routine (step 1130). If the allowed spool space is still insufficient, the routine may return to partition the rows of R at each AMP into two subsets according to step 1106. If the spool space is sufficient for a traditional redistribution or duplication parallel join operation, a traditional redistribution or duplication of the rows is performed followed by local joins and completion of the parallel join (step 1132). The optimized join routine cycle may then end (step 1134).

Figure 12:
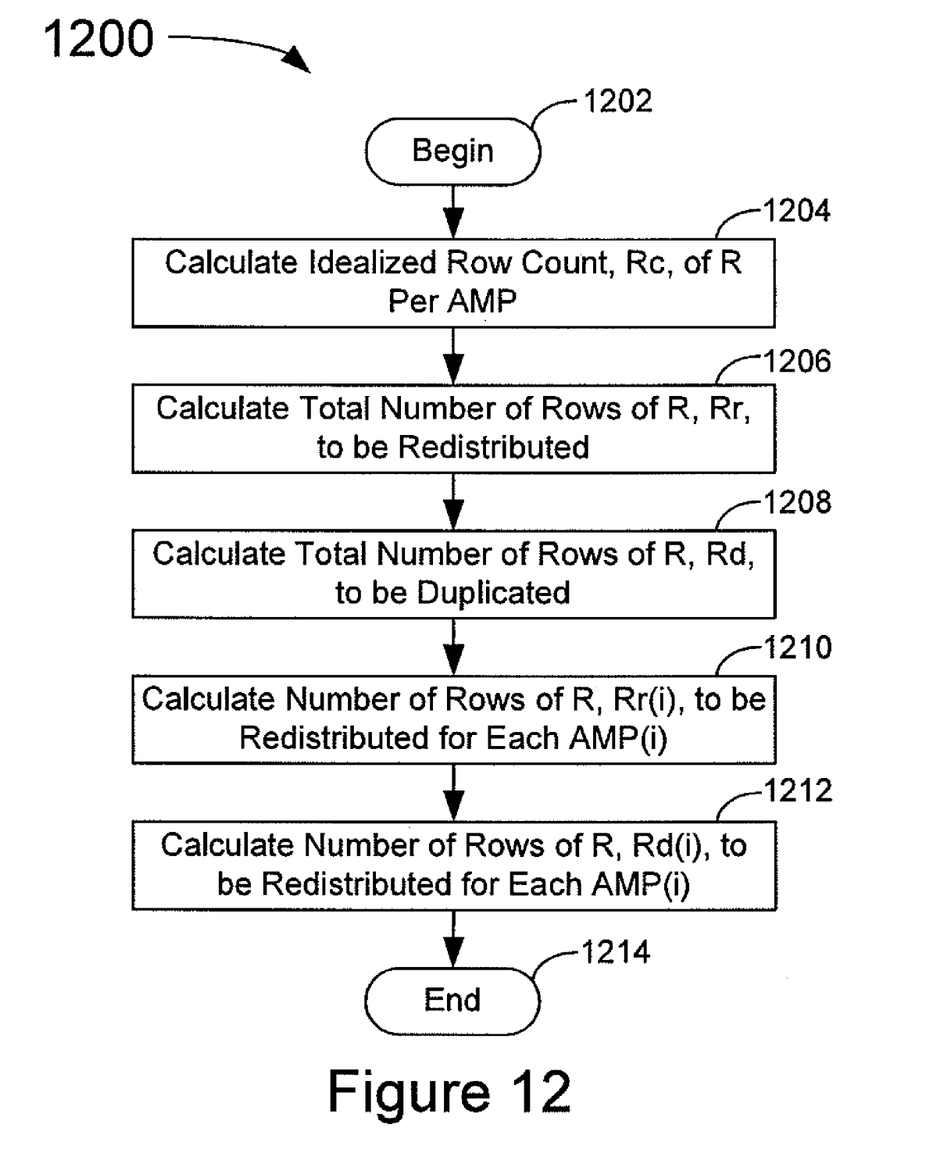
FIG. 12 is a flowchart that depicts processing of a partitioning subroutine that facilitates partitioning a table into two row subsets for respective redistribution and duplication in accordance with an embodiment.

FIG. 12 is a flowchart 1200 that depicts processing of a partitioning subroutine that facilitates partitioning a table into two row subsets for respective redistribution and duplication in accordance with an embodiment. The partitioning subroutine may be invoked at step 1106 of FIG. 11 for determining the row counts of the subsets R1 and R2.

The partitioning subroutine is invoked (step 1202), and an idealized row count, Rc, of rows of table R per AMP after redistribution and duplication of table R is calculated (step 1204). For example, Rc may be calculated as follows:

$$Rc = R*RS_R/(R*RS_R + S*RS_S)*Sp/RS_R \qquad \text{eq. 3}$$

where R is the total number of rows in the table R, $RS_R$ is the row size of table R rows, e.g., in bytes, S is the total number of rows of the table S, $RS_S$ is the row size of table S rows, and Sp comprises the spool size limit on each AMP. In the present example, assume Sp comprises the spool space that may be used for rows of R and S, i.e., that Sp does not include spool space necessary for local join results. Thus, Rc is calculated as the product of the proportion of the table R size relative to the total size of both tables R and S and the allowable spool space relative to the table R row size.

Next, the partitioning subroutine calculates the total number of rows of R, Rr, to be redistributed (step 1206) and the total number of rows of R, Rd, to be duplicated (step 1208). For example, the total number of rows of R may be defined as follows:

$$Rr + Rd = R \qquad \text{eq. 4}$$

Thus, the idealized number of row count of R per AMP may be defined as follows:

$$Rc = Rr/m + Rd \quad \text{eq. 5}$$

where m is the number of AMPs.

Accordingly, equations 3-5 may be solved to yield the following:

$$Rr = m/(m-1) * (R - R/(R*RS_R + S*RS_S)*Sp) \quad \text{eq. 6}$$

The idealized number of rows of R to be duplicated may be expressed simply as:

$$Rd = R - Rr \quad \text{eq. 7}$$

The partitioning subroutine may then calculate the number of rows of R, Rr(i), to be redistributed by each AMP(i) (step 1210) and the number of rows of R, Rd(i), to be duplicated by each AMP(i) (step 1212), and the partitioning subroutine cycle may then end (step 1214). For example, the number of rows of Rr(i) and Rd(i) for a particular AMP(i) may be calculated as follows:

$$Rr(i) = Ra/R * Rr \quad \text{eq. 8}$$

$$Rd(i) = Ra/R * Rd \quad \text{eq. 9}$$

Equations 6 and 8 may then be solved for Rr(i) as follows:

$$Rr(i) = m/(m-1) * Ra * (1 - 1/(R*RS_R + S*RS_S)*Sp) \quad \text{eq. 10}$$

Likewise, equations 7 and 9 may be solved for Rd(i) as follows:

$$Rd(i) = 1/(m-1) * Ra * (m*Sp/(R*RS_R + S*RS_S) - 1) \quad \text{eq. 11}$$

In this manner, the number of rows of the relation R to be redistributed, i.e., the number of rows of relation R allocated to the subset R1, are calculated according to equation 10 for each AMP(i), and the number of rows to be duplicated, i.e., the number of rows of relation R allocated to the subset R2, are calculated according to equation 11 for each AMP(i). It should be understood that the partitioning subroutine of FIG. 12 may be similarly performed for determining the number of rows of relation S to be partitioned among the subsets S1 and S2 for respective redistribution and duplication thereof. The particular implementation of the partitioning subroutine of FIG. 12 is exemplary only, and various other mechanisms may be substituted therefor to determine suitable numbers of rows to be allocated to the row subsets R1 and R2 (and likewise S1 and S2) for each AMP.

As described, a method, computer-readable medium, and system that facilitate duplication optimization for parallel join operations are provided. A respective set of rows of a first table and a second table involved in a join operation are distributed to each of a plurality of processing modules. The join operation comprises a join on a first column of the first table and a second column of the second table. Each of the plurality of processing modules redistributes at least a portion of the rows of the first table distributed thereto substantially equally among the other processing modules and duplicates at least a portion of the rows of the second table distributed thereto among the plurality of processing modules. The disclosed optimization mechanisms provide for reduced spool space requirements for execution of the parallel join operation.

The flowcharts of FIGS. 7, 11 and 12 depict process serialization to facilitate an understanding of disclosed embodiments and are not necessarily indicative of the serialization of the operations being performed. In various embodiments, the processing steps described in FIGS. 7, 11 and 12 may be performed in varying order, and one or more depicted steps may be performed in parallel with other steps. Additionally, execution of some processing steps of FIGS. 7, 11 and 12 may be excluded without departing from embodiments disclosed herein.

The illustrative block diagrams and flowcharts depict process steps or blocks that may represent modules, segments, or portions of code that include one or more executable instructions for implementing specific logical functions or steps in the process. Although the particular examples illustrate specific process steps or procedures, many alternative implementations are possible and may be made by simple design choice. Some process steps may be executed in different order from the specific description herein based on, for example, considerations of function, purpose, conformance to standard, legacy structure, user interface design, and the like.

Aspects of the disclosed embodiments may be implemented in software, hardware, firmware, or a combination thereof. The various elements of the system, either individually or in combination, may be implemented as a computer program product tangibly embodied in a machine-readable storage device for execution by a processing unit. Various steps of embodiments may be performed by a computer processor executing a program tangibly embodied on a computer-readable medium to perform functions by operating on input and generating output. The computer-readable medium may be, for example, a memory, a transportable medium such as a compact disk, a floppy disk, or a diskette, such that a computer program embodying aspects of the disclosed embodiments can be loaded onto a computer. The computer program is not limited to any particular embodiment, and may, for example, be implemented in an operating system, application program, foreground or background process, or any combination thereof, executing on a single processor or multiple processors. Additionally, various steps of embodiments may provide one or more data structures generated, produced, received, or otherwise implemented on a computer-readable medium, such as a memory.

Although disclosed embodiments have been illustrated in the accompanying drawings and described in the foregoing description, it will be understood that embodiments are not limited to the disclosed examples, but are capable of numerous rearrangements, modifications, and substitutions without departing from the disclosed embodiments as set forth and defined by the following claims. For example, the capabilities of the disclosed embodiments can be performed fully and/or partially by one or more of the blocks, modules, processors or memories. Also, these capabilities may be performed in the current manner or in a distributed manner and on, or via, any device able to provide and/or receive information. Still further, although depicted in a particular manner, a greater or lesser number of modules and connections can be utilized with the present disclosure in order to accomplish embodiments, to provide additional known features to present embodiments, and/or to make disclosed embodiments more efficient. Also, the information sent between various modules can be sent between the modules via at least one of a data network, an Internet Protocol network, a wireless source, and a wired source and via a plurality of protocols.

What is claimed is:

1. A method of performing a join operation in a parallel processing system, comprising:
   distributing a respective set of rows of a first table and a second table involved in a join operation to each of a plurality of processing modules, wherein the join operation comprises a join on a first column of the first table and a second column of the second table;

redistributing, by each of the plurality of processing modules, at least a portion of the rows of the first table distributed thereto substantially equally among the other processing modules;

duplicating, by each of the plurality of processing modules, at least a portion of the rows of the second table distributed thereto among the plurality of processing modules;

dividing, by each of the plurality of processing modules, rows of the first table distributed thereto into a first subset and a second subset;

dividing, by each of the plurality of processing modules, rows of the second table distributed thereto into a third subset and a fourth subset;

redistributing, by each of the plurality of processing modules, the rows of the first subset substantially equally among the other processing modules;

redistributing, by each of the plurality of processing modules, the rows of the third subset substantially equally among the other processing modules;

duplicating, by each of the plurality of processing modules, the rows of the second subset distributed thereto among each of the plurality of processing modules;

duplicating, by each of the plurality of processing modules, the rows of the fourth subset distributed thereto substantially equally among each of the plurality of processing modules;

placing, by each of the plurality of processing modules, redistributed rows of the first subset received by the processing module into a respective first spool;

placing, by each of the plurality of processing modules, duplicated rows of the second subset received by the processing module into a respective second spool;

placing, by each of the plurality of processing modules, redistributed rows of the third subset received by the processing module into a respective third spool;

placing, by each of the plurality of processing modules, duplicated rows of the fourth subset received by the processing module into a respective fourth spool;

joining, by each of the plurality of processing modules, rows of the respective first spool with rows of the respective fourth spool;

joining, by each of the plurality of processing modules, rows of the respective second spool with rows of the respective third spool;

joining, by one of the plurality of processing modules, rows of the respective second spool with rows of the respective fourth spool; and removing, by each of the plurality of processing modules, rows of the respective second spool and rows of the respective fourth spool.

2. A database management system, comprising:

a plurality of processing modules;

an interconnect that communicatively couples each of the plurality of processing modules; and at least one storage device to which respective sets of rows of a first table and a second table involved in a join operation are distributed to each of the plurality of processing modules, wherein the join operation comprises a join on a first column of the first table and a second column of the second table, wherein each of the plurality of processing modules redistributes at least a portion of the rows of the first table distributed thereto substantially equally among the other processing modules and duplicates at least a portion of the rows of the second table distributed thereto among the plurality of processing modules;

wherein each of the plurality of processing modules divides rows of the first table distributed thereto into a first subset and a second subset and divides rows of the second table distributed thereto into a third subset and a fourth subset;

wherein each of the plurality of processing modules redistributes the rows of the first subset substantially equally among the other processing modules and redistributes the rows of the third subset substantially equally among the other processing modules;

wherein each of the plurality of processing modules duplicates the rows of the second subset distributed thereto among each of the plurality of processing modules and duplicates the rows of the fourth subset distributed thereto substantially equally among each of the plurality of processing modules;

wherein each of the plurality of processing modules places redistributed rows of the first subset received by the processing module into a respective first spool, places duplicated rows of the second subset received by the processing module into a respective second spool, places redistributed rows of the third subset received by the processing module into a respective third spool, and places duplicated rows of the fourth subset received by the processing module into a respective fourth spool;

wherein each of the plurality of processing modules joins rows of the respective first spool with rows of the respective fourth spool;

wherein each of the plurality of processing modules joins rows of the respective second spool with rows of the respective third spool;

wherein one of the plurality of processing modules joins rows of the respective second spool with rows of the respective fourth spool;

wherein each of the plurality of processing modules removes rows of the respective second spool and rows of the respective fourth spool.

\* \* \* \* \*